(12) United States Patent
Khanna et al.

(10) Patent No.: US 12,537,674 B2
(45) Date of Patent: Jan. 27, 2026

(54) METHOD AND SYSTEM FOR SECURELY REPORTING AND STORING COMPUTER SECURITY PROFILES

(71) Applicant: Mastercard International Incorporated, Purchase, NY (US)

(72) Inventors: Mohit Khanna, New Delhi (IN); Vinit Sinha, Delhi (IN); Amit Gupta, New Delhi (IN); Simran Manchanda, New Delhi (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 152 days.

(21) Appl. No.: 18/376,984

(22) Filed: Oct. 5, 2023

(65) Prior Publication Data
US 2025/0119277 A1    Apr. 10, 2025

(51) Int. Cl.
*H04L 9/08* (2006.01)
*H04L 9/00* (2022.01)

(52) U.S. Cl.
CPC .............. *H04L 9/0852* (2013.01); *H04L 9/50* (2022.05)

(58) Field of Classification Search
CPC ................................ H04L 9/0852; H04L 9/50
See application file for complete search history.

(56) References Cited

U.S. PATENT DOCUMENTS 11,356,252 B1\* 6/2022 Islam ...................... H04L 51/18
2024/0022584 A1\* 1/2024 Kravitz ................. H04L 9/0891

\* cited by examiner

*Primary Examiner* — Olugbenga O Idowu
(74) *Attorney, Agent, or Firm* — Panitch Schwarze Belisario & Nadel LLP

(57) ABSTRACT

A method for secure storage of cybersecurity data in a blockchain includes: identifying, by a processor of a processing server, a device profile for a computing device; encrypting, by the processor of the processing server, the device profile into an encrypted device profile using a public key of a first cryptographic key pair; encrypting, by the processor of the processing server, the encrypted device profile into a converted device profile via quantum cryptography using a first configuration key; and transmitting, by a transmitter of the processing server, the converted device profile to a blockchain node in a blockchain network.

12 Claims, 6 Drawing Sheets

500

METHOD AND SYSTEM FOR SECURELY REPORTING AND STORING COMPUTER SECURITY PROFILES

FIELD

The present disclosure relates to securely reporting and storing computer security profiles, specifically the use of blockchain and multiple levels of encryption for the secure storage of cybersecurity data.

BACKGROUND

Blockchain was initially created to provide a platform through which cryptographic currency could be traded. Two of major tenets in the creation of blockchain are that the blockchain itself would be entirely decentralized, being stored on and managed via a vast distribution of computing systems, and that the cryptocurrency transactions could be conducted with full anonymity, where no identification information needed to be provided to participant and all transactions were between blockchain wallets without regard for ownership thereof. These two tenets led to a large adoption in blockchain and its use in the creation and management of a vast number and variety of cryptographic currencies.

Another tenet of blockchain is that the data on the chain itself is immutable. Because of the complicated nature of adding new blocks to the blockchain, as well as the decentralized architecture, blocks that are added to the blockchain cannot be removed or modified, providing a valuable means of secure data storage. As a result, many uses for blockchains have been developed outside of cryptocurrency, such as the storage of ownership records, supply chain management, and logistics.

Cybersecurity insurance has become an emerging market, where entities have seen the value in being protected against cyber-attacks and data breaches and is one such industry that can derive value from the use of blockchain for data storage. However, the sensitivity of cybersecurity data results in a greater need for protection than can be provided by a traditional blockchain. Additionally, the types of attacks that occur for which cybersecurity insurance is needed are often attacks that have malicious effects on the ability for a claim to be adequately submitted, supported, and processed. Thus, there is a need for a technological solution to provide for the secured transmission and storage of cybersecurity data using a blockchain that provides adequate protection against the most sophisticated attack attempts.

SUMMARY

The present disclosure provides a description of systems and methods for secure storage of cybersecurity data in a blockchain. An entity that has a cybersecurity insurance policy can identify device profiles for computing devices covered by the insurance policy. The entity can encrypt the device profiles using a public key of a cryptographic key pair using a standard method of cryptographic key encryption. The entity can then encrypt the encrypted device profile into a converted device profile using quantum cryptography and a known configuration key. This converted device profile can be transmitted to a blockchain node. In some cases, the blockchain node can store the converted device profile in its converted form where only the insurance provider has the appropriate configuration key and private key to access the original data. In other cases, the blockchain node can possess the private key and configuration key to obtain the original device profiles, which can be stored on a private blockchain, where the blockchain node can repeat the double encryption process using a different public key and configuration key known to the insurance provider when the data is needed by the insurance company. The result is immutable storage of device profiles for accuracy and security, while the double encryption process using quantum cryptography ensures that the data is adequately secure during transmission in addition to storage, providing for significantly increased protection over traditional systems.

A method for secure storage of cybersecurity data in a blockchain includes: identifying, by a processor of a processing server, a device profile for a computing device; encrypting, by the processor of the processing server, the device profile into an encrypted device profile using a public key of a first cryptographic key pair; encrypting, by the processor of the processing server, the encrypted device profile into a converted device profile via quantum cryptography using a first configuration key; and transmitting, by a transmitter of the processing server, the converted device profile to a blockchain node in a blockchain network.

A system for secure storage of cybersecurity data in a blockchain includes: a blockchain network including a blockchain node; a computing device; and a processing server, wherein the processing server includes a processor identifying a device profile for the computing device, encrypting the device profile into an encrypted device profile using a public key of a first cryptographic key pair, and encrypting the encrypted device profile into a converted device profile via quantum cryptography using a first configuration key, and a transmitter transmitting the converted device profile to a blockchain node in a blockchain network.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

System for Secure Transmission and Storage of Cybersecurity Data

Figure 1:
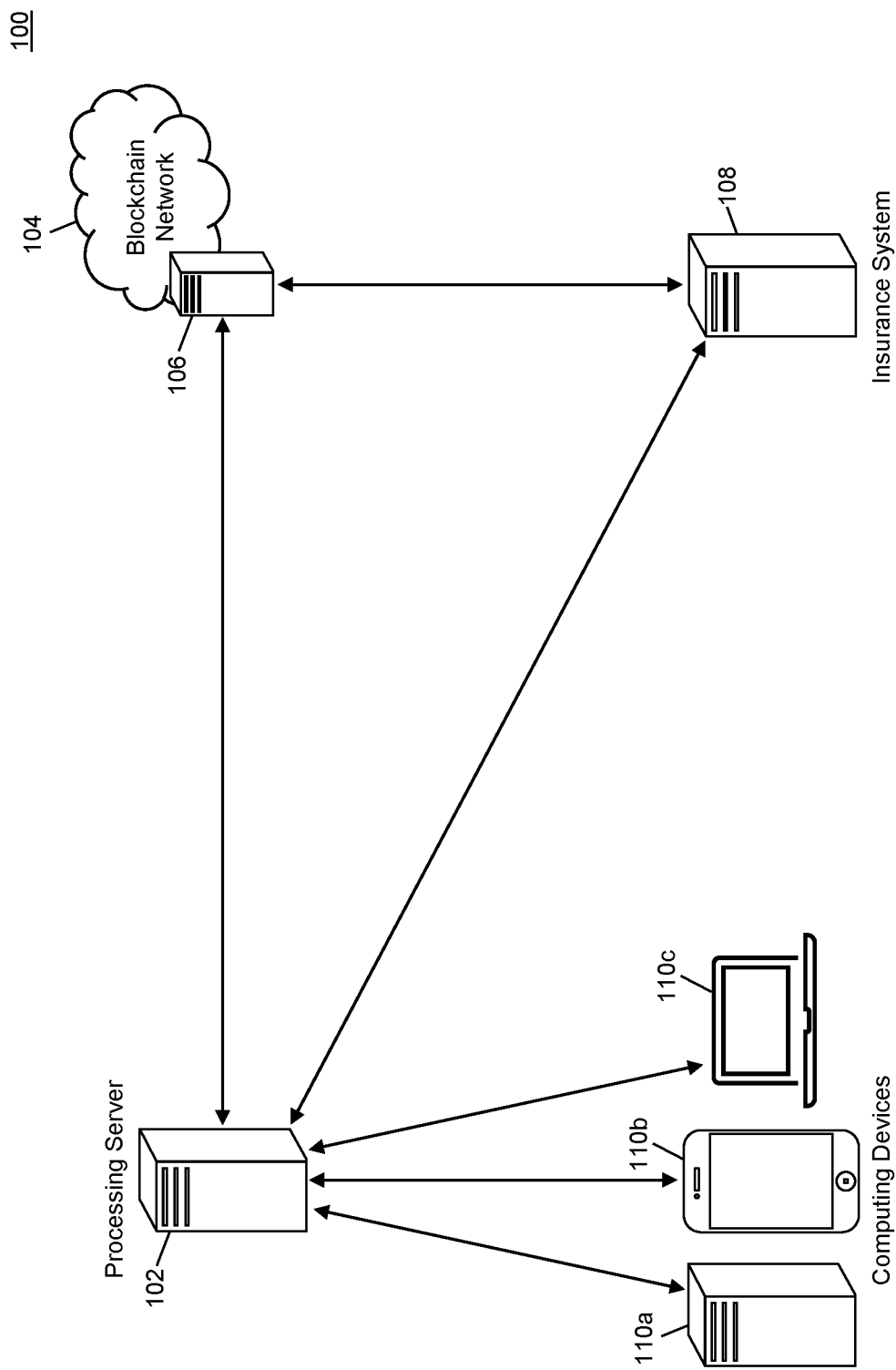
FIG. 1 is a block diagram illustrating a high-level system architecture for secure transmission and storage of cybersecurity data using blockchain in accordance with exemplary embodiments.
Figure 2:
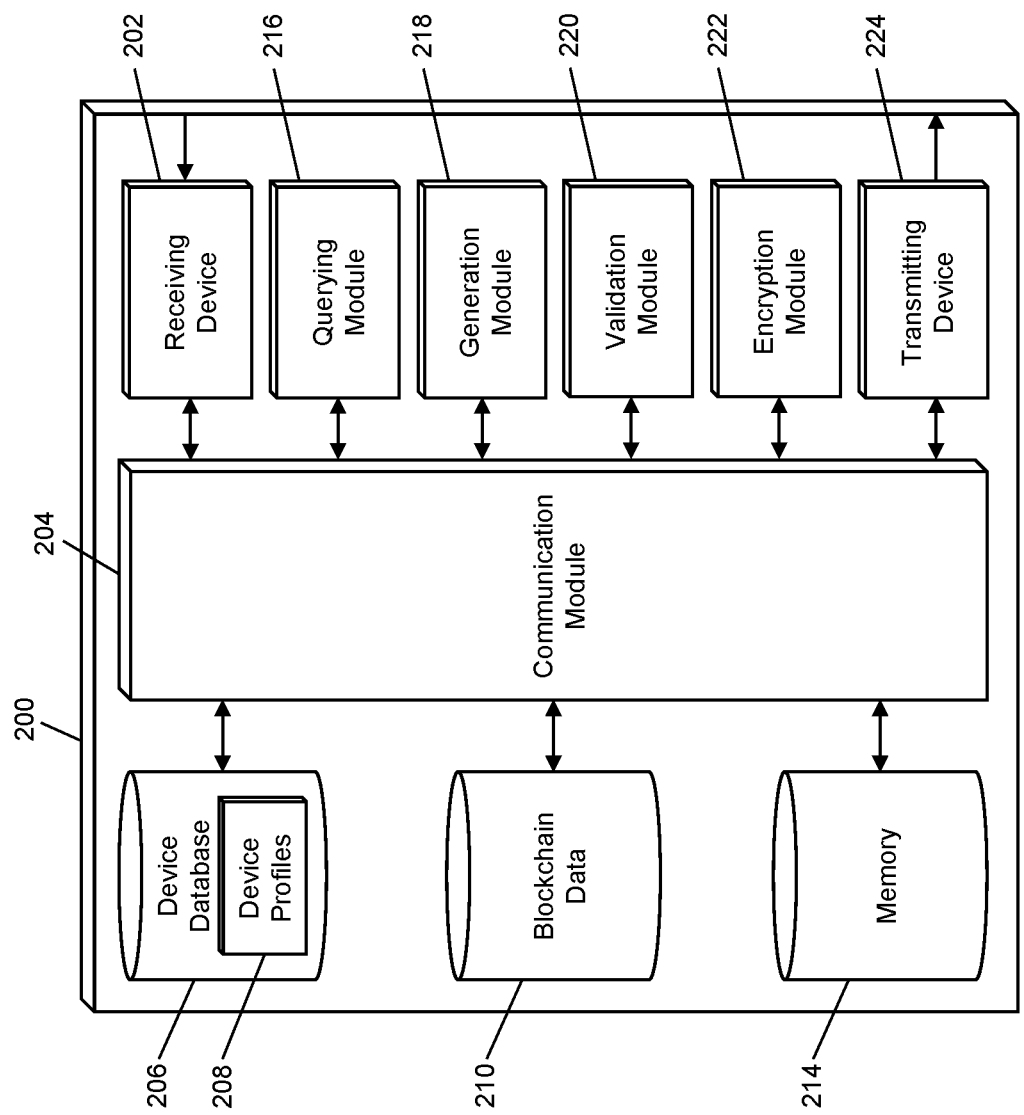
FIG. 2 is a block diagram illustrating a computing system in the system of FIG. 1 for secure transmission and storage of cybersecurity data using blockchain in accordance with exemplary embodiments.
Figure 6:
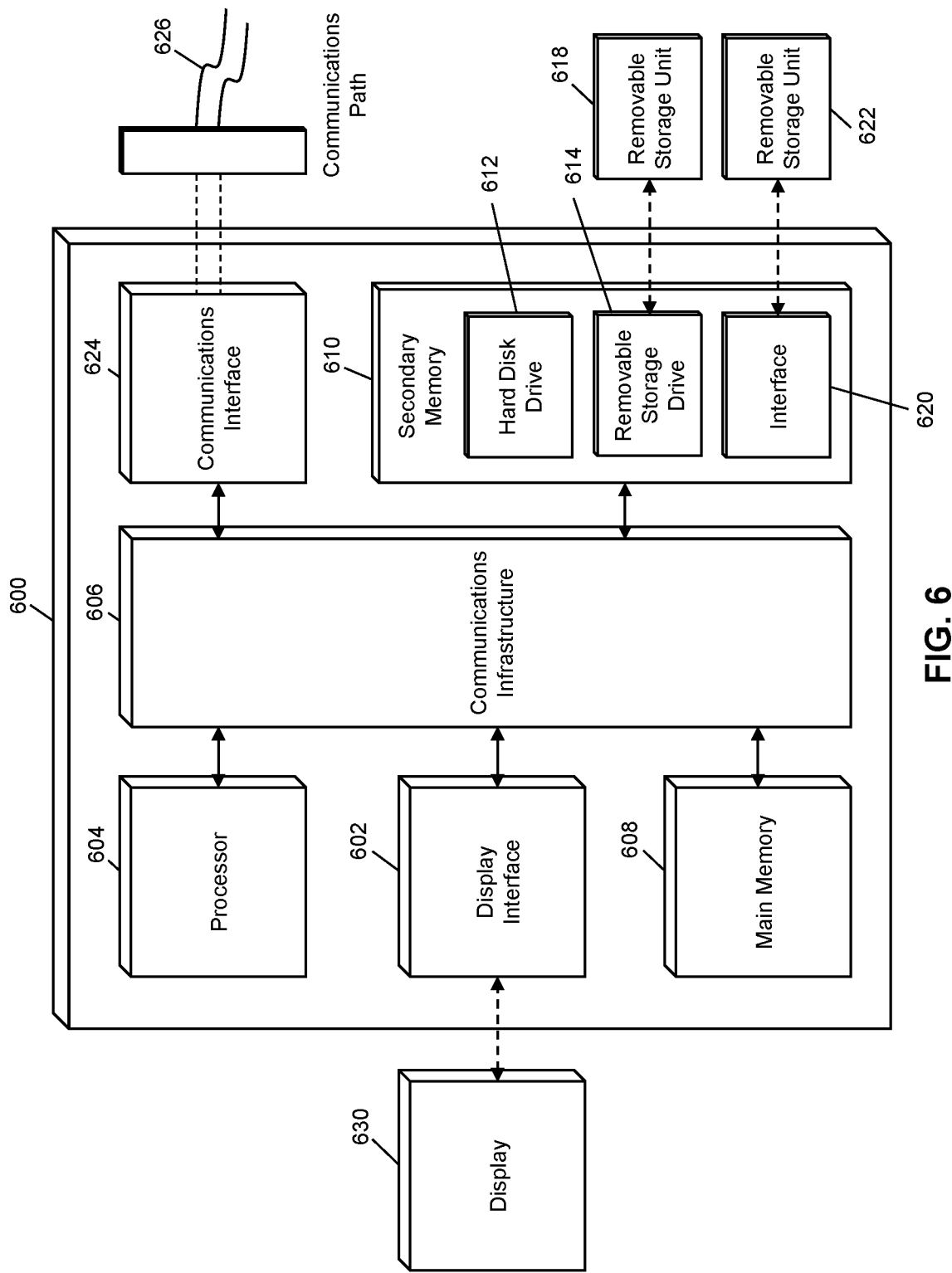
FIG. 6 is a block diagram illustrating a computer system architecture in accordance with exemplary embodiments.

FIG. 1 illustrates a system 100 for the secure transmission and storage of cybersecurity data through multiple layers of encryption and a blockchain. The system 100 can include a processing server 102. The processing server 102, discussed in more detail below, can be a computing system, such as illustrated in FIG. 2 or 6, discussed in more detail below, of an entity that is interested in having cybersecurity cover one or more computing devices 110. Data regarding the computing devices 110 can be stored in a blockchain associated with a blockchain network 104. The blockchain network 104 can be comprised of a plurality of blockchain nodes 106. Each blockchain node 106 can be a computing system, such as illustrated in FIG. 2 or 6, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain can be a distributed ledger that is comprised of at least a plurality of blocks. Each block can include at least a block header and one or more data values. Each block header can include at least a timestamp, a block reference value, and a data reference value. The timestamp can be a time at which the block header was generated and can be represented using any suitable method (e.g., UNIX timestamp, DateTime, etc.). The block reference value can be a value that references an earlier block (e.g., based on timestamp) in the blockchain. In some embodiments, a block reference value in a block header can be a reference to the block header of the most recently added block prior to the respective block. In an exemplary embodiment, the block reference value can be a hash value generated via the hashing of the block header of the most recently added block. The data reference value can similarly be a reference to the one or more data values stored in the block that includes the block header. In an exemplary embodiment, the data reference value can be a hash value generated via the hashing of the one or more data values. For instance, the block reference value can be the root of a Merkle tree generated using the one or more data values.

The use of the block reference value and data reference value in each block header can result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 106 in a blockchain network 104 prior to the generation and addition of a new block to the blockchain in order for the change to be made permanent. Computational and communication limitations can make such a modification exceedingly difficult, if not impossible, thus rendering the blockchain immutable.

In some embodiments, the blockchain can be used to store information regarding blockchain transactions conducted between two different blockchain wallets. A blockchain wallet can include a private key of a cryptographic key pair that is used to generate digital signatures that serve as authorization by a payer for a blockchain transaction, where the digital signature can be verified by the respective blockchain network 104 using the public key of the cryptographic key pair. In some cases, the term "blockchain wallet" can refer specifically to the private key. In other cases, the term "blockchain wallet" can refer to a computing device (e.g., participant system 106) that stores the private key for use thereof in blockchain transactions. For instance, each computing device can each have their own private key for respective cryptographic key pairs and can each be a blockchain wallet for use in transactions with the blockchain associated with the blockchain network. Computing devices can be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain can correspond to a blockchain transaction or other storage of data, as applicable. A blockchain transaction can consist of at least: a digital signature of the sender of that is generated using the sender's private key, a blockchain address of the recipient of currency generated using the recipient's public key, and a blockchain currency amount that is transferred, or other data being stored. In some blockchain transactions, the transaction can also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction can also include the sender's public key, for use by an entity in validating the transaction. For the traditional processing of a blockchain transaction, such data can be provided to a blockchain node 106 in a blockchain network 104, either by the sender or the recipient. The node can verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block can be validated by other blockchain nodes 106 in the blockchain network 104 before being added to the blockchain and distributed to all of the blockchain nodes 106 in the blockchain network 104, respectively, in traditional blockchain implementations. In cases where a blockchain data value cannot be related to a blockchain transaction, but instead the storage of other types of data, blockchain data values can still include or otherwise involve the validation of a digital signature.

In the system 100, the blockchain can be used for the storage of device profiles for cybersecurity. The processing server 102 can identify device profiles for a plurality of different computing devices 110, illustrated in FIG. 1 as computing devices 110a, 110b, and 110c. Computing devices 110 can be any type of device that can be covered by a cybersecurity insurance policy for which an entity can be interested in protection, such as a desktop computer, laptop computer, notebook computer, tablet computer, cellular phone, smart phone, smart watch, smart television, wearable computing device, internet of things device, customer premises equipment, router, switch, server, etc. A device profile can include any suitable information regarding the associated computing device 110, such as a media access control address, identification value, registration number, serial number, operating system data, software version, firmware version, installed applications, application versions, network connections, port statuses, maintenance history, warranty data, security data, compliance data, incident history, etc. The processing server 102 can identify the device profiles for each computing device 110 using any suitable method. In one example, each computing device 110 can be configured to generate a device profile that is transmitted to the processing server 102 using a suitable method. In another example, the processing server 102 can request data from each computing device 110 and create the device profile based on data provided by the computing device 110 in response to the request. In yet another example, third party devices or systems can capture device profiles of computing devices 110, which can then be provided to the processing server 102 using any suitable network or method.

Once the processing server 102 has obtained a device profile, the processing server 102 can encrypt the device profile into an encrypted device profile using a public key of a cryptographic key pair. Any suitable type of cryptographic key encryption can be used, such as Secure Hash Algorithm 2. The public key can be of a cryptographic key pair for which a blockchain node 106 in the blockchain network 104 has the corresponding private key. In some cases, the blockchain node 106 can generate the cryptographic key pair and provide the public key to the processing server 102, such as during a registration process. In some instances, the processing server 102 can request a public key from the blockchain node 106 prior to encrypting a device profile.

After encrypting the device profile, the processing server 102 can perform quantum cryptography to further encrypt the encrypted device profile into a "converted" device profile. The processing server 102 can use a configuration key when performing quantum cryptography. The configuration key can be shared between the processing server 102 and the blockchain node 106. In some embodiments, the processing server 102 can generate the configuration key when performing the quantum cryptography and can electronically transmit the configuration key to the blockchain node 106 using a suitable communication network and method. In other embodiments, the blockchain node 106 can generate the configuration key and provide the configuration key to the processing server 102, such as during a registration process. In some instances, the processing server 102 can request the configuration key from the blockchain node 106 prior to performing the quantum cryptography.

The use of quantum cryptography to convert the encrypted device profile can provide for significantly further protection of the device profile, as an attempted decryption using an incorrect configuration key results in changing of the converted device profile such that the correct configuration key can no longer successfully decrypt the converted device profile. This enables the processing server 102 and blockchain node 106 to identify when an attempt is made to access the converted device profile by an unauthorized party, which provides for greater protection and security.

Once the encrypted device profile has been encrypted into the converted device profile using the quantum cryptography, the processing server 102 can electronically transmit the converted device profile to the blockchain node 106 using a suitable communication network and method. In cases where the processing server 102 is to provide the configuration key to the blockchain node 106, the configuration key can be included in the transmission with the converted device profile or can be transmitted to the blockchain node 106 in a separate transmission. In some instances, the configuration key can be encrypted using a shared secret for transmission or transmitted to the blockchain node 106 using another suitable form of protection.

The blockchain node 106 can decrypt the converted device profile into the encrypted device profile via the use of quantum cryptography and the configuration key. As discussed above, in cases where an attempt is made to decrypt the converted device profile using an incorrect configuration key, the decryption can fail. In such cases, the blockchain node 106 can request a new converted device profile from the processing server 102 using a new configuration key, which can be provided by the blockchain node 106 or received from the processing server 102. Once the converted device profile is decrypted into the encrypted device profile, the blockchain node 106 can decrypt the encrypted device profile using the private key of the cryptographic key pair to obtain the device profile.

The blockchain node 106 can generate a new blockchain data entry that includes the device profile. In some cases, a separate blockchain data entry can be generated for each computing device 110 for which a device profile is provided (e.g., which can be encrypted and converted together using the above methods or encrypted and converted separately). In other cases, a single blockchain data entry can be generated that includes all device profiles received from a processing server 102. In some instances, the blockchain node 106 can be configured to identify device profiles for other computing devices 110 associated with the processing server 102 and/or a specific insurance policy, such as stored in prior blockchain data entries, and include the identified device profiles along with newly received device profiles in the new blockchain data entry. In such an instance, each blockchain data entry can include the latest device profile for all covered computing devices 110. In some cases, a blockchain data entry can include identifying information for the computing device(s) 110 whose device profiles are stored therein, the processing server 102 that submitted the device profiles, the insurance policy that covers the associated computing device(s) 110, or the insurance system 108 that is configured to collect device profiles for use in processing claims on the insurance policy.

Once a new blockchain data entry is generated, it can be included in a new block generated by the blockchain node 106. The new block can then be transmitted to a plurality of other blockchain nodes 106 in the blockchain network 104 and confirmed thereby. Once confirmed, the new block can be added to the blockchain. In some embodiments, the blockchain network 104 can operate a plurality of different blockchains. In such embodiments, a separate blockchain can be used for each processing server 102, for each insurance system 108, for each insurance policy, etc. In an exemplary embodiment, the blockchain can be a private blockchain where data stored therein cannot be accessed by any unauthorized system. In some such embodiments, only blockchain nodes 106 can be authorized to access the data stored in the blockchain.

In the system 100, the processing server 102 (e.g., or an entity associated therewith operating via the processing server 102) can be interested in filing a claim for the insurance policy over one or more of the computing devices 110. The processing server 102 can electronically submit a claim to the insurance system 108 using a suitable communication network and method. The submission of the claim can include data identifying the claim, identification data for each applicable computing device 110, and any other suitable data that will be apparent to persons having ordinary skill in the art. The insurance system 108 can receive the claim and can request device profiles for each applicable computing device 110 from a blockchain node 106 in the blockchain network 104 using the provided identification data.

The blockchain node 106 can receive the request and identify the device profiles stored in the blockchain using the provided identification data. Once identified, the blockchain node 106 can double encrypt the identified device profiles using the process discussed above using a public key of a second cryptographic key pair and a second configuration key. The private key of the second cryptographic key pair can be possessed by the insurance system 108, where the insurance system 108 can provide the public key to the blockchain node 106, such as during a registration process or as part of the request for the device profiles. The second configuration key can be generated or otherwise identified by the blockchain node 106 and provided to the insurance system 108 or generated or otherwise identified by the insurance system 108 and provided to the blockchain node 106, which can be included in the request for device profiles or a separate transmission.

Once the blockchain node 106 has encrypted the device profiles with the public key of the second cryptographic key pair and converted the encrypted device profiles with the second configuration key, the blockchain node 106 can electronically transmit the converted device profiles to the insurance system 108 in response to the received request. The insurance system 108 can receive the converted device profiles and decrypt the converted device profiles into encrypted device profiles using quantum cryptography and the second configuration key, and then decrypt the encrypted device profiles into the unencrypted device profiles using the private key of the second cryptographic key pair. The insurance system 108 can then use traditional methods and systems for processing the claim while using the received device profiles following the decryption. In instances where a computing device 110 has been compromised, history data in the device profile can reveal such a compromise, where such data cannot be altered, hidden, or obscured in the transmission and storage thereof as a result of the immutability of the blockchain and use of two layers of encryption including quantum cryptography.

The result is that claims can be processed with greater accuracy and security, thereby providing significant technological benefits to entities and insurance companies through the use of this technology.

In some embodiments, blockchain nodes 106 can be configured to store converted device profiles on the blockchain. In such embodiments, the blockchain node 106 can receive the converted device profiles from the processing server 102 and store the converted device profiles in new blockchain data entries that are added to the blockchain. In such cases, blockchain nodes 106 may never be in possession of the configuration key used in the quantum cryptography and may not supply the public key used in the encryption of device profiles. In these instances, the insurance system 108 can generate the cryptographic key pair and provide the public key to the processing server 102, such as during issuance of the insurance policy, and the configuration key can be exchanged between the processing server 102 and insurance system 108. When the insurance system 108 requests device profiles, the blockchain node 106 can identify the already converted device profiles, such as through accompany identification data provided by the processing server 102, and transmit the already converted device profiles to the insurance system 108 for decryption thereof. In some cases, the blockchain can be a public blockchain or a permissioned blockchain where the insurance system 108 can access the converted device profiles stored directly on the blockchain for greater efficiency.

In some embodiments, the blockchain nodes 106 may utilize a firewall to further protect transmissions to and/or from the blockchain nodes 106 and the processing server 102 and/or insurance system 108. Additional security measures can be incorporated into the system 100 in addition to those discussed herein as the methods and systems discussed herein can accommodate any additional desires or requirements of participating entities. The methods and systems discussed herein utilize two layers of encryption, including quantum cryptography, as well as blockchain to ensure that cybersecurity data is secure and immutable in both transmission and storage, providing for a layer of security that is unavailable using existing systems. This provides for greater protection for both insurers and insured, particularly in the case of cyber-attacks that can traditionally negatively impact the claim process itself in addition to the compromise of computing devices 110, resulting in a significant improvement over traditional systems.

Computing Systems

FIG. 2 illustrates an embodiment of a computing system 200. The computing system 200 can operate as any suitable component in the system 100 of FIG. 1, such as the processing server 102, blockchain nodes 106, insurance system 108, or computing devices 110. It will be apparent to persons having skill in the relevant art that the embodiment of the computing system 200 illustrated in FIG. 2 is provided as illustration only and cannot be exhaustive to all possible configurations of the computing system 200 suitable for performing the functions as discussed herein. For example, the computer system 500 illustrated in FIG. 5 and discussed in more detail below can be a suitable configuration of the computing system 200.

The computing system 200 can include a receiving device 202. The receiving device 202 can be configured to receive data over one or more networks via one or more network protocols. In some instances, the receiving device 202 can be configured to receive data from processing servers 102, blockchain nodes 106, insurance systems 108, computing devices 110, and other systems and entities via one or more communication methods, such as radio frequency, local area networks, wireless area networks, cellular communication networks, Bluetooth, the Internet, etc. In some embodiments, the receiving device 202 can be comprised of multiple devices, such as different receiving devices for receiving data over different networks, such as a first receiving device for receiving data over a local area network and a second receiving device for receiving data via the Internet. The receiving device 202 can receive electronically transmitted data signals, where data can be superimposed or otherwise encoded on the data signal and decoded, parsed, read, or otherwise obtained via receipt of the data signal by the receiving device 202. In some instances, the receiving device 202 can include a parsing module for parsing the received data signal to obtain the data superimposed thereon. For example, the receiving device 202 can include a parser program configured to receive and transform the received data signal into usable input for the functions performed by the processing device to carry out the methods and systems described herein.

The receiving device 202 can be configured to receive data signals electronically transmitted by processing servers 102 that are superimposed or otherwise encoded with converted device profiles, submitted insurance claims, identification data for computing devices 110, public key requests, configuration keys, configuration key requests, requests for device profile data, etc. The receiving device 202 can also be configured to receive data signals electronically transmitted by blockchain nodes 106, which can be superimposed or otherwise encoded with converted device profiles, public keys, configuration keys, configuration key requests, request for identification data, blockchain data entries, blocks, confirmation messages, etc. The receiving device 202 can also be configured to receive data signals electronically transmitted by insurance systems 108 that can be superimposed or otherwise encoded with requests for device profiles, identification data for computing devices 110, public keys, configuration keys, configuration key requests, data messages regarding insurance claims, etc. The receiving device 202 can also be configured to receive data signals electronically transmitted by computing devices 110, which can be superimposed or otherwise encoded with device profiles, device profile data, identification data, etc.

The computing system 200 can also include a communication module 204. The communication module 204 can be configured to transmit data between modules, engines, databases, memories, and other components of the computing system 200 for use in performing the functions discussed herein. The communication module 204 can be comprised of one or more communication types and utilize various communication methods for communications within a computing device. For example, the communication module 204 can be comprised of a bus, contact pin connectors, wires, etc. In some embodiments, the communication module 204 can also be configured to communicate between internal components of the computing system 200 and external components of the computing system 200, such as externally connected databases, display devices, input devices, etc. The computing system 200 can also include a processing device. The processing device can be configured to perform the functions of the computing system 200 discussed herein as will be apparent to persons having skill in the relevant art. In some embodiments, the processing device can include and/or be comprised of a plurality of engines and/or modules specially configured to perform one or more functions of the processing device, such as a querying module 216, generation module 218, validation module 220, encryption module 222, etc. As used herein, the term "module" can be software or hardware particularly programmed to receive an input, perform one or more processes using the input, and provides an output. The input, output, and processes performed by various modules will be apparent to one skilled in the art based upon the present disclosure.

The computing system 200 can also include a device database 206. The device database 206 can be configured to store one or more device profiles 208 using a suitable data storage format and schema. The device database 206 can be a relational database that utilizes structured query language for the storage, identification, modifying, updating, accessing, etc. of structured data sets stored therein. Each device profile 208 can be a structured data set configured to store data related to a computing device, which can include, for example, a device profile, data used for a device profile, identification data, etc.

The computing system 200 can also include blockchain data 210, which can be stored in a memory 214 of the processing server 102 or stored in a separate area within the computing system 200 or accessible thereby. The blockchain data 210 can include a blockchain, which may be comprised of a plurality of blocks and be associated with the blockchain network 104 and a blockchain. In some cases, the blockchain data 210 can further include any other data associated with the blockchain and management and performance thereof, such as block generation algorithms, digital signature generation and confirmation algorithms, communication data for blockchain nodes 106, smart contracts, cryptographic keys, etc.

The computing system 200 can also include a memory 214. The memory 214 can be configured to store data for use by the computing system 200 in performing the functions discussed herein, such as public and private keys, symmetric keys, etc. The memory 214 can be configured to store data using suitable data formatting methods and schema and can be any suitable type of memory, such as read-only memory, random access memory, etc. The memory 214 can include, for example, encryption keys and algorithms, communication protocols and standards, data formatting standards and protocols, program code for modules and application programs of the processing device, and other data that can be suitable for use by the computing system 200 in the performance of the functions disclosed herein as will be apparent to persons having skill in the relevant art. In some embodiments, the memory 214 can be comprised of or can otherwise include a relational database that utilizes structured query language for the storage, identification, modifying, updating, accessing, etc. of structured data sets stored therein. The memory 214 can be configured to store, for example, device profiles, device profile data, configuration keys, cryptographic keys including public keys and/or private keys, communication data, blockchain algorithms and data, insurance claim data, encryption algorithms, etc.

The computing system 200 can include a querying module 216. The querying module 216 can be configured to execute queries on databases to identify information. The querying module 216 can receive one or more data values or query strings and can execute a query string based thereon on an indicated database, such as the blockchain data 206 of the computing system 200 to identify information stored therein. The querying module 216 can then output the identified information to an appropriate engine or module of the computing system 200 as necessary. The querying module 216 can, for example, execute a query on the device database 206 to identify a device profile 208 for updating thereof and use in double encryption for secure storage on a blockchain.

The computing system 200 can also include a generation module 218. The generation module 218 can be configured to generate data for use by the computing system 200 in performing the functions discussed herein. The generation module 218 can receive instructions as input, can generate data based on the instructions, and can output the generated data to one or more modules of the computing system 200. For example, the generation module 218 can be configured to generate blockchain data entries, blocks, encryption keys, device profiles, request messages, configuration keys, claim data, etc.

The computing system 200 can also include a validation module 220. The validation module 220 can be configured to perform data validations and verifications for the computing system 200 as part of the functions discussed herein. The validation module 220 can receive instructions as input, can perform data validations or verification as instructed, and can output a result of the data validations or verifications to one or more modules of the computing system 200. In some cases, the input can include the data to be validated or verified and/or data to be used in the validation or verification. In other cases, the validation module 220 can be configured to identify such data, such as in the device database 206 and/or memory 214. The validation module 220 can be configured to, for example, validate new blockchain data entries and/or blocks, verify digital signatures, validate device profile data, verify successful encryptions, verify configuration key or cryptographic key authenticity, etc.

The computing system 200 can also include an encryption module 222. The encryption module 222 can be configured to encrypt and/or decrypt data for the computing system 200 as part of the functions discussed herein. The encryption module 222 can receive instructions as input, can encrypt or decrypt data as instructed, and can output a result of the encryption or decryption to one or more modules of the computing system 200. In some cases, the input can include the data to be encrypted or decrypted and/or keys for use in the encryption or decryption. In other cases, the encryption module 222 can be configured to identify such data, such as in the memory 214. The encryption module 222 can be configured to encrypt device profiles using public keys of cryptographic key pairs, encrypt encrypted device profiles via quantum cryptography using configuration keys, decrypt converted device profiles via quantum cryptographic using configuration keys, and decrypt encrypted device profiles using private keys of cryptographic key pairs.

The computing system 200 can also include a transmitting device 224. The transmitting device 224 can be configured to transmit data over one or more networks via one or more network protocols. In some instances, the transmitting device 224 can be configured to transmit data to processing servers 102, blockchain nodes 106, insurance systems 108, computing devices 110, and other entities via one or more communication methods, local area networks, wireless area networks, cellular communication, Bluetooth, radio frequency, the Internet, etc. In some embodiments, the transmitting device 224 can be comprised of multiple devices, such as different transmitting devices for transmitting data over different networks, such as a first transmitting device for transmitting data over a local area network and a second transmitting device for transmitting data via the Internet. The transmitting device 224 can electronically transmit data signals that have data superimposed that can be parsed by a receiving computing device. In some instances, the transmitting device 224 can include one or more modules for superimposing, encoding, or otherwise formatting data into data signals suitable for transmission.

The transmitting device 224 can be configured to electronically transmit data signals to processing servers 102 that can be superimposed or otherwise encoded with device profiles, device profile data, identification data for computing devices 110, insurance claim data, identification data requests, public keys, configuration keys, configuration key requests, etc. The transmitting device 224 can also be configured to electronically transmit data signals to blockchain nodes 106, which can be superimposed or otherwise encoded with converted device profiles, public key requests, configuration keys, configuration key requests, identification data for computing devices 110, device profile requests, blockchain data entries, blocks, confirmation messages, etc. The transmitting device 224 can also be configured to electronically transmit data signals to insurance systems 108 that can be superimposed or otherwise encoded with converted device profiles, identification data for computing devices 110, public key requests, configuration keys, configuration key requests, data messages regarding insurance claims, etc. The transmitting device 224 can also be configured to electronically transmit data signals to computing devices 110, which can be superimposed or otherwise encoded with device profile request data, data requests, etc.

Process for Secure Storage of Cybersecurity Data

Figure 3:
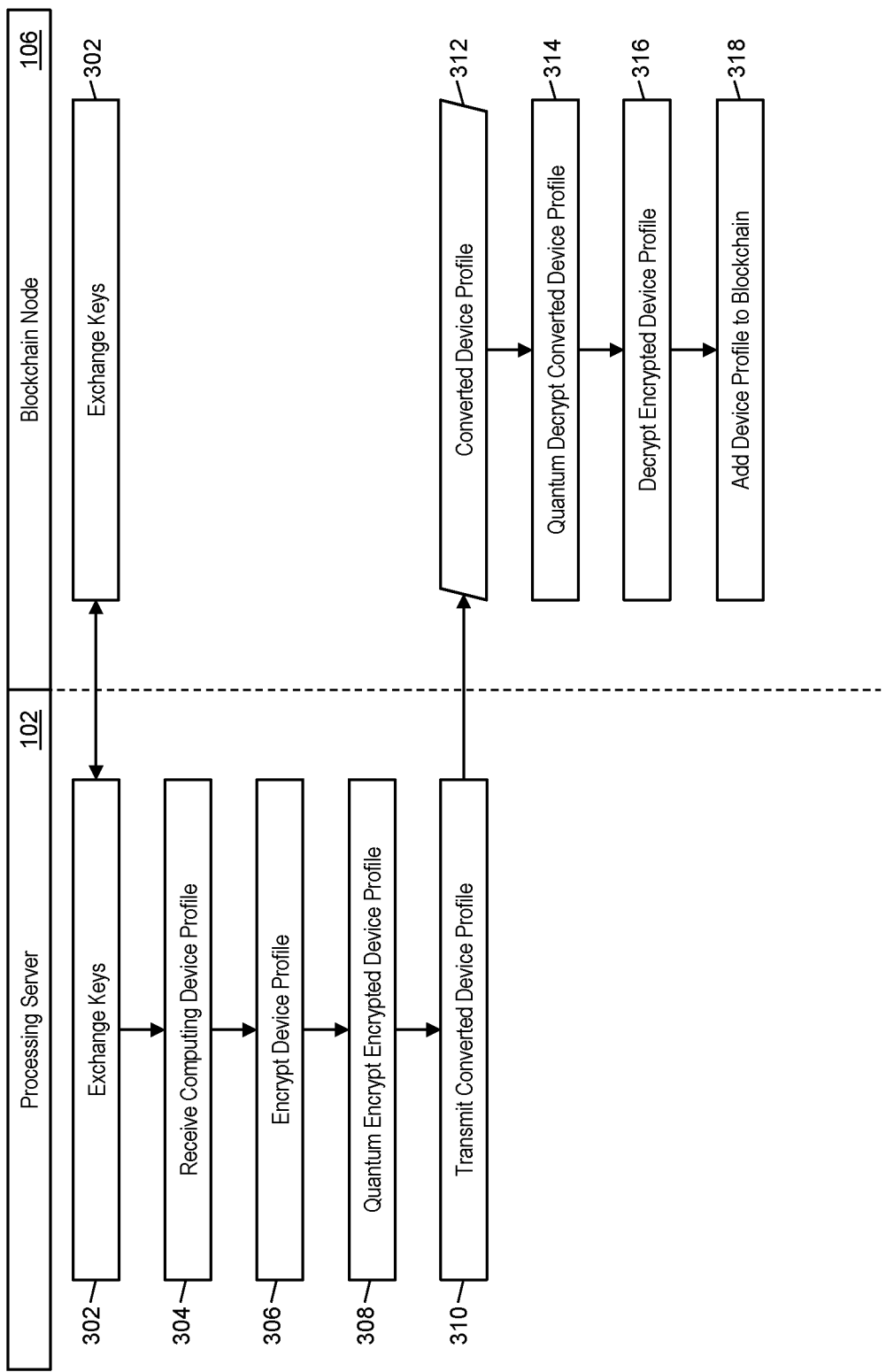
FIG. 3 is a flow diagram illustrating a process for secure transmission of cybersecurity data to a blockchain and storage therein in the system of FIG. 1 in accordance with exemplary embodiments.

FIG. 3 illustrates a process in the system 100 of FIG. 1 for the secure transmission of cybersecurity data to a blockchain node 106 and secure storage thereof therein using double encryption and a blockchain.

In step 302, the processing server 102 and blockchain node 106 can exchange keys. The blockchain node 106 can generate a cryptographic key pair including a public key and a private key and can provide the public key to the processing server 102. The processing server 102 or blockchain node 106 can also generate a configuration key for use in quantum cryptography that can be provided to the other system. In step 304, a receiving device 202 of the processing server 102 can receive a device profile from a computing device 110 using a suitable communication network and method. In step 306, an encryption module 222 of the processing server 102 can encrypt the device profile into an encrypted device profile using the public key from the blockchain node 106. In step 308, the encryption module 222 of the processing server 102 can encrypt the encrypted device profile into a converted device profile via quantum cryptography using the configuration key.

In step 310, a transmitting device 224 of the processing server 102 can electronically transmit the converted device profile to the blockchain node 106 using a suitable communication network and method. In step 312, a receiving device 202 of the blockchain node 106 can receive the converted device profile from the processing server 102. In step 314, an encryption module 222 of the blockchain node 106 can decrypt the converted device profile into the encrypted device profile via quantum cryptography using the configuration key. In step 316, the encryption module 222 of the blockchain node 106 can decrypt the encrypted device profile into the device profile for the computing device 110 using the private key of the cryptographic key pair generated earlier by the blockchain node 106. In step 318, the blockchain node 106 can generate a new blockchain data entry that includes the device profile that is included in a new block that is confirmed and added to the blockchain.

Process for Secure Transmission of Cybersecurity Data

Figure 4:
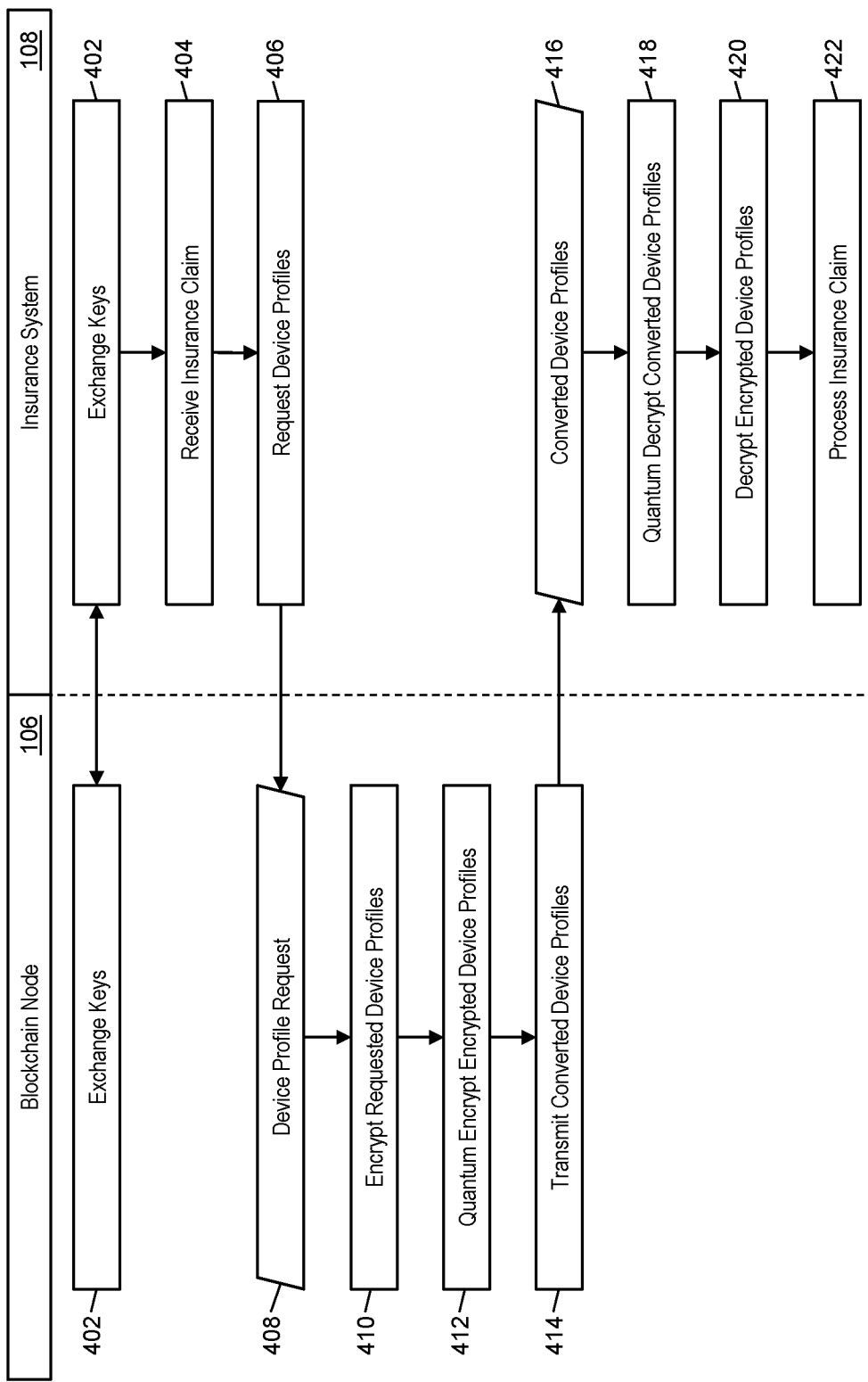
FIG. 4 is a flow diagram illustrating a process for the secure storage of cybersecurity data in a blockchain and secure transmission therefrom in the system of FIG. 1 in accordance with exemplary embodiments.

FIG. 4 illustrates a process in the system 100 of FIG. 1 for the secure transmission of cybersecurity data securely stored in a blockchain from a blockchain node 106 to an insurance system 108 using double encryption.

In step 402, the blockchain node 106 and insurance system 108 can exchange keys. The insurance system 108 can generate a cryptographic key pair including a public key and a private key and can provide the public key to the blockchain node 106. The blockchain node 106 or insurance system 108 can also generate a configuration key for use in quantum cryptography that can be provided to the other system. In step 404, a receiving device 202 of the insurance system 108 can receive an insurance claim (e.g., from the processing server 102) using a suitable communication network and method. The insurance claim can specify one or more device profiles for computing devices 110 covered by an insurance policy for which compensation is requested by including identification data associated therewith. In step 406, a transmitting device 224 of the insurance system 108 can electronically transmit a request for device profiles to the blockchain node 106 using a suitable communication network and method. The request for device profiles can include the identification data for each of the computing devices 110 for which a device profile is requested.

In step 408, a receiving device 202 of the blockchain node 106 can receive the device profile request. The blockchain node 106 can identify the requested device profiles stored in the blockchain using the provided identification data and, in step 410, an encryption module 222 of the blockchain node 106 can encrypt the device profiles into encrypted device profiles using the public key from the insurance system 108. In step 412, the encryption module 222 of the blockchain node 106 can encrypt the encrypted device profiles into converted device profiles via quantum cryptography using the configuration key.

In step 414, a transmitting device 224 of the blockchain node 106 can electronically transmit the converted device profiles to the insurance system 108 using a suitable communication network and method. In step 416, a receiving device 202 of the insurance system 108 can receive the converted device profiles from the blockchain node 106. In step 418, an encryption module 222 of the insurance system 108 can decrypt the converted device profiles into the encrypted device profiles via quantum cryptography using the configuration key. In step 420, the encryption module 222 of the insurance system 108 can decrypt the encrypted device profiles into the device profiles for the computing devices 110 using the private key of the cryptographic key pair generated earlier by the insurance system 108. In step 422, the insurance system 108 can then process the insurance claim using the device profiles.

Exemplary Method for Secure Storage of Cybersecurity Data

Figure 5:
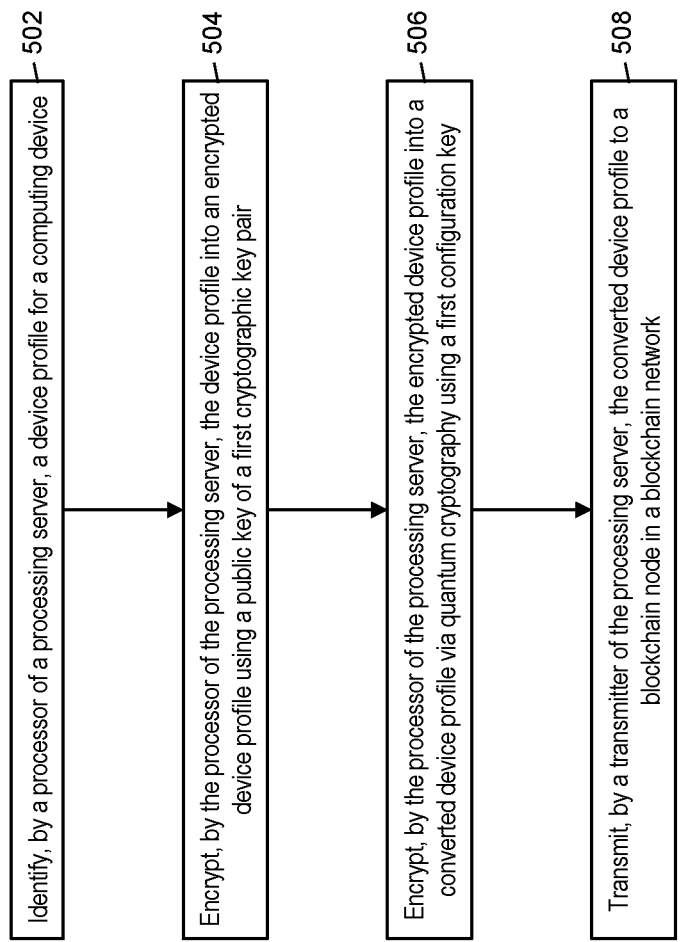
FIG. 5 is a flow chart illustrating an exemplary method for secure transmission and storage of cybersecurity data using blockchain in accordance with exemplary embodiments.

FIG. 5 illustrates a method 500 for the secure storage of cybersecurity data in a blockchain through the use of double encryption and quantum cryptography.

In step 502, a device profile (e.g., device profile 208) for a computing device (e.g., computing device 110) can be identified by a processor (e.g., querying module 216) of a processing server (e.g., processing server 102). In step 504, the device profile can be encrypted by the processor (e.g., encryption module 222) of the processing server into an encrypted device profile using a public key of a first cryptographic key pair.

In step 508, the encrypted device profile can be encrypted by the processor of the processing server into a converted device profile via quantum cryptographic using a first configuration key. In step 510, the converted device profile can be transmitted by a transmitter (e.g., transmitting device 224) of the processing server to a blockchain node (e.g., blockchain node 106) in a blockchain network (e.g., blockchain network 104). In one embodiment, the method 500 can further include: generating, by a processor (e.g., generation module 218) of the blockchain node, a new block that includes the converted device profile; and storing, by the blockchain node, the generated new block in a blockchain associated with the blockchain network.

In some embodiments, the method 500 can also include: decrypting, by a processor (e.g., encryption module 222) of the blockchain node, the converted device profile into the encrypted device profile via quantum cryptography and the first configuration key; decrypting, by the processor of the blockchain node, the encrypted device profile into the device profile using a private key of the first cryptographic key pair; generating, by the processor of the blockchain node, a new block that includes the device profile; and storing, by the blockchain node, the generated new block in a blockchain associated with the blockchain network. In a further embodiment, the method 500 can further include receiving, by a receiver (e.g., receiving device 202) of the processing server, the public key of the first cryptographic key pair from the blockchain node prior to encrypting the device profile. In another further embodiment, the method 500 can further include transmitting, by the transmitter of the processing server, the first configuration key to the blockchain node.

In another further embodiment, the method 500 can further include: encrypting, by the processor of the blockchain node, the device profile into an alternative encrypted device profile using a public key of a second cryptographic key pair; encrypting, by the processor of the blockchain node, the alternative encrypted device profile into an alternative converted device profile via quantum cryptography using a second configuration key; and transmitting, by a transmitter (e.g., transmitting device 224) of the blockchain node, the alternative converted device profile to an external computing system (e.g., insurance system 108). In an even further embodiment, the method 500 can even further include receiving, by a receiver (e.g., receiving device 202) of the blockchain node, the public key of the second cryptographic key pair from the external computing system prior to encrypting the device profile into the alternative encrypted device profile. In another even further embodiment, the method 500 can even further include transmitting, by the transmitter of the blockchain node, the second configuration key to the external computing system.

Computer System Architecture

FIG. 6 illustrates a computer system 600 in which embodiments of the present disclosure, or portions thereof, can be implemented as computer-readable code. For example, the processing server 102, blockchain nodes 106, insurance system 108, and computing devices 110 can be implemented in the computer system 600 using hardware, non-transitory computer readable media having instructions stored thereon, or a combination thereof and can be implemented in one or more computer systems or other processing systems. Hardware can embody modules and components used to implement the methods of FIGS. 3-5.

If programmable logic is used, such logic can execute on a commercially available processing platform configured by executable software code to become a specific purpose computer or a special purpose device (e.g., programmable logic array, application-specific integrated circuit, etc.). A person having ordinary skill in the art can appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device.

For instance, at least one processor device and a memory can be used to implement the above-described embodiments.

A processor unit or device as discussed herein can be a single processor, a plurality of processors, or combinations thereof. Processor devices can have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

A processor device 604 can be a special purpose or a general-purpose processor device specifically configured to perform the functions discussed herein. The processor device 604 can be connected to a communications infrastructure 606, such as a bus, message queue, network, multi-core message-passing scheme, etc. The network can be any network suitable for performing the functions as disclosed herein and can include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 can also include a main memory 608 (e.g., random access memory, read-only memory, etc.), and can also include a secondary memory 610. The secondary memory 610 can include the hard disk drive 612 and a removable storage drive 614, such as a floppy disk drive, a magnetic tape drive, an optical disk drive, a flash memory, etc.

The removable storage drive 614 can read from and/or write to the removable storage unit 618 in a well-known manner. The removable storage unit 618 can include a removable storage media that can be read by and written to by the removable storage drive 614. For example, if the removable storage drive 614 is a floppy disk drive or universal serial bus port, the removable storage unit 618 can be a floppy disk or portable flash drive, respectively. In one embodiment, the removable storage unit 618 can be non-transitory computer readable recording media.

In some embodiments, the secondary memory 610 can include alternative means for allowing computer programs or other instructions to be loaded into the computer system 600, for example, the removable storage unit 622 and an interface 620. Examples of such means can include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) can be stored on any type of suitable computer readable media, such as optical storage (e.g., a compact disc, digital versatile disc, Blu-ray disc, etc.) or magnetic tape storage (e.g., a hard disk drive). The data can be configured in any type of suitable database configuration, such as a relational database, a structured query language (SQL) database, a distributed database, an object database, etc. Suitable configurations and storage types will be apparent to persons having skill in the relevant art.

The computer system 600 can also include a communications interface 624. The communications interface 624 can be configured to allow software and data to be transferred between the computer system 600 and external devices. Exemplary communications interfaces 624 can include a modem, a network interface (e.g., an Ethernet card), a communications port, a PCMCIA slot and card, etc. Software and data transferred via the communications interface 624 can be in the form of signals, which can be electronic, electromagnetic, optical, or other signals as will be apparent to persons having skill in the relevant art. The signals can travel via a communications path 626, which can be configured to carry the signals and can be implemented using wire, cable, fiber optics, a phone line, a cellular phone link, a radio frequency link, etc.

The computer system 600 can further include a display interface 602. The display interface 602 can be configured to allow data to be transferred between the computer system 600 and external display 630. Exemplary display interfaces 602 can include high-definition multimedia interface (HDMI), digital visual interface (DVI), video graphics array (VGA), etc. The display 630 can be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium can refer to memories, such as the main memory 608 and secondary memory 610, which can be memory semiconductors (e.g., DRAMs, etc.). These computer program products can be means for providing software to the computer system 600. Computer programs (e.g., computer control logic) can be stored in the main memory 608 and/or the secondary memory 610. Computer programs can also be received via the communications interface 624. Such computer programs, when executed, can enable computer system 600 to implement the present methods as discussed herein. In particular, the computer programs, when executed, can enable processor device 604 to implement the methods illustrated by FIGS. 3-5, as discussed herein. Accordingly, such computer programs can represent controllers of the computer system 600. Where the present disclosure is implemented using software, the software can be stored in a computer program product and loaded into the computer system 600 using the removable storage drive 614, interface 620, and hard disk drive 612, or communications interface 624.

The processor device 604 can comprise one or more modules or engines configured to perform the functions of the computer system 600. Each of the modules or engines can be implemented using hardware and, in some instances, can also utilize software, such as corresponding to program code and/or programs stored in the main memory 608 or secondary memory 610. In such instances, program code can be compiled by the processor device 604 (e.g., by a compiling module or engine) prior to execution by the hardware of the computer system 600. For example, the program code can be source code written in a programming language that is translated into a lower-level language, such as assembly language or machine code, for execution by the processor device 604 and/or any additional hardware components of the computer system 600. The process of compiling can include the use of lexical analysis, preprocessing, parsing, semantic analysis, syntax-directed translation, code generation, code optimization, and any other techniques that can be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

The result of this technological advancement is that insurance policies and claims regarding cyber security and the like can be processed with greater accuracy and security while facilitating computational efficiency, data immutability and greater assurance of accuracy in making the information available on a distributed ledger, thereby providing significant technological benefits to entities and insurance companies. For example, data cannot be altered, hidden, or obscured in the transmission and storage thereof as a result of the immutability of the blockchain and use of two layers of encryption including quantum cryptography. This provides for greater protection for both insurers and insured, particularly in the case of cyber-attacks that can traditionally negatively impact the claim process itself in addition to the compromise of computing devices, resulting in a significant improvement over traditional systems. Further, the blockchain or blockchains can be public blockchain or permissioned blockchain(s) where the insurance system can access the converted device profiles stored directly on the blockchain for greater efficiency.

Techniques consistent with the present disclosure provide, among other features, systems and methods for secure storage of cybersecurity data in a blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or can be acquired from practicing of the disclosure, without departing from the breadth or scope.

What is claimed is:

1. A method for secure storage of cybersecurity data in a blockchain, comprising:
    identifying, by a processor of a processing server, a device profile for a computing device;
    encrypting, by the processor of the processing server, the device profile into an encrypted device profile using a public key of a first cryptographic key pair;
    encrypting, by the processor of the processing server, the encrypted device profile into a converted device profile via quantum cryptography using a first configuration key;
    transmitting, by a transmitter of the processing server, the converted device profile to a blockchain node in a blockchain network;
    decrypting, by a processor of the blockchain node, the converted device profile into the encrypted device profile via quantum cryptography and the first configuration key;
    decrypting, by the processor of the blockchain node, the encrypted device profile into the device profile using a private key of the first cryptographic key pair;
    generating, by the processor of the blockchain node, a new block that includes the device profile; and
    storing, by the blockchain node, the generated new block in a blockchain associated with the blockchain network.

2. The method of claim 1, further comprising:
    receiving, by a receiver of the processing server, the public key of the first cryptographic key pair from the blockchain node prior to encrypting the device profile.

3. The method of claim 1, further comprising:
    transmitting, by the transmitter of the processing server, the first configuration key to the blockchain node.

4. The method of claim 1 further comprising:
    encrypting, by the processor of the blockchain node, the device profile into an alternative encrypted device profile using a public key of a second cryptographic key pair;
    encrypting, by the processor of the blockchain node, the alternative encrypted device profile into an alternative converted device profile via quantum cryptography using a second configuration key; and
    transmitting, by a transmitter of the blockchain node, the alternative converted device profile to an external computing system.

5. The method of claim 4, further comprising:
    receiving, by a receiver of the blockchain node, the public key of the second cryptographic key pair from the external computing system prior to encrypting the device profile into the alternative encrypted device profile.

6. The method of claim 4, further comprising:
    transmitting, by the transmitter of the blockchain node, the second configuration key to the external computing system.

7. A system for secure storage of cybersecurity data in a blockchain, comprising:
    a blockchain network including a blockchain node;
    a computing device; and
    a processing server, wherein
    the processing server includes
        a processor
            identifying a device profile for the computing device,
            encrypting the device profile into an encrypted device profile using a public key of a first cryptographic key pair, and
            encrypting the encrypted device profile into a converted device profile via quantum cryptography using a first configuration key, and
        a transmitter transmitting the converted device profile to a blockchain node in a blockchain network,
    wherein the blockchain node
        decrypts, by a processor of the blockchain node, the converted device profile into the encrypted device profile via quantum cryptography and the first configuration key,
        decrypts, by the processor of the blockchain node, the encrypted device profile into the device profile using a private key of the first cryptographic key pair,
        generates, by the processor of the blockchain node, a new block that includes the device profile, and
        stores the generated new block in a blockchain associated with the blockchain network.

8. The system of claim 7, wherein a receiver of the processing server receives the public key of the first cryptographic key pair from the blockchain node prior to encrypting the device profile.

9. The system of claim 7, wherein the transmitter of the processing server transmits the first configuration key to the blockchain node.

10. The system of claim 7, further comprising:
an external computing system, wherein
the blockchain node further
   encrypts, by the processor of the blockchain node, the device profile into an alternative encrypted device profile using a public key of a second cryptographic key pair,
   encrypts, by the processor of the blockchain node, the alternative encrypted device profile into an alternative converted device profile via quantum cryptography using a second configuration key, and
   transmits, by a transmitter of the blockchain node, the alternative converted device profile to an external computing system.

11. The system of claim 10, wherein a receiver of the blockchain node receives the public key of the second cryptographic key pair from the external computing system prior to encrypting the device profile into the alternative encrypted device profile.

12. The system of claim 10, wherein the transmitter of the blockchain node transmits the second configuration key to the external computing system.

* * * * *